(12) United States Patent
Gravino et al.

(10) Patent No.: US 9,118,965 B1
(45) Date of Patent: Aug. 25, 2015

(54) VIRTUAL VIDEO CHANNELS

(75) Inventors: Douglas David Gravino, Roswell, GA (US); Michael Lee Poffenberger, Sandy Springs, GA (US); Ryan M. S. Baker, Lilburn, GA (US)

(73) Assignee: Cox Communications, Inc., Atlanta, GA (US)

( * ) Notice: Subject to any disclaimer, the term of this patent is extended or adjusted under 35 U.S.C. 154(b) by 145 days.

(21) Appl. No.: 13/282,000

(22) Filed: Oct. 26, 2011

(51) Int. Cl.
*H04N 21/462* (2011.01)
*H04N 21/2668* (2011.01)

(52) U.S. Cl.
CPC ......... *H04N 21/4622* (2013.01); *H04N 21/462* (2013.01); *H04N 21/2668* (2013.01)

(58) Field of Classification Search
CPC . H04N 21/438; H04N 21/454; H04N 21/462; H04N 21/4622; H04N 21/482; H04N 21/2543; H04N 21/4821; H04N 21/4532; H04N 21/47202; H04N 21/2668; H04N 5/44543
See application file for complete search history.

(56) References Cited

U.S. PATENT DOCUMENTS

| | | | |
|---|---|---|---|
| 7,406,704 B2* | 7/2008 | Kitsukawa et al. | 725/46 |
| 8,019,683 B1* | 9/2011 | Swanburg et al. | 705/40 |
| 8,302,126 B2* | 10/2012 | Allison et al. | 725/45 |
| 8,375,208 B2* | 2/2013 | Darapu et al. | 713/168 |
| 2006/0037083 A1* | 2/2006 | Kortum et al. | 726/28 |
| 2007/0006266 A1* | 1/2007 | Yamamoto | 725/46 |
| 2007/0028258 A1* | 2/2007 | Wollmershauser et al. | 725/29 |
| 2008/0022310 A1* | 1/2008 | Poling et al. | 725/46 |
| 2009/0100480 A1* | 4/2009 | McQuaide, Jr. | 725/100 |
| 2009/0133049 A1* | 5/2009 | Bradley | 725/28 |
| 2009/0158346 A1* | 6/2009 | Zer et al. | 725/47 |
| 2009/0249394 A1* | 10/2009 | Schwesinger et al. | 725/39 |
| 2011/0099579 A1* | 4/2011 | Kim et al. | 725/44 |
| 2011/0214154 A1* | 9/2011 | Nagano | 725/87 |
| 2012/0117599 A1* | 5/2012 | Jin et al. | 725/41 |
| 2013/0042284 A1* | 2/2013 | Kandanala et al. | 725/104 |
| 2013/0061260 A1* | 3/2013 | Maskatia et al. | 725/28 |
| 2014/0013353 A1* | 1/2014 | Mathur | 725/34 |

* cited by examiner

*Primary Examiner* — Pinkal R Chokshi
(74) *Attorney, Agent, or Firm* — Benjamin A. Balser; Balser & Grell IP Law (57) ABSTRACT

Embodiments are configured to populate one or more virtual channels with accessible video content from disparate sources. Users are oftentimes overwhelmed with an abundance of available video content. Embodiments of the present invention may be utilized to generate an index of all video content to which a user has access from various video content providing systems and cross-match the index of video content with tagged video metadata. The cross-matched video content may be processed through various filters and mapped to one or more classifications. One or more virtual channels may be generated according to the one or more classifications and populated with the cross-matched video content. The virtual channels are customized to the user based on the availability of the content to the user and on user preference data.

20 Claims, 3 Drawing Sheets

VIRTUAL VIDEO CHANNELS

BACKGROUND

In today's modern digital age, an abundance of consumer-facing video content exists in a variety of different delivery systems provided by many different content providers. For example, users may receive video content via various delivery systems including, but not limited to, cable television, Internet, satellite, etc. Manually searching for specific content from the abundance of video content can be overwhelming to a user. Additionally, manually searching through disparate delivery systems separately to find specific content can be inefficient. Presently, a cohesive listing of available video content (e.g., Internet, television, local video, etc.) that is available to a specific user at a given time does not exist.

Current searches for specific content may yield extensive results, creating a situation with too many options from which to choose. Furthermore, refining a search for specific video content based on a specific genre often produces results which may not satisfy a user's desires. Based on variables, such as geographic location, cable or satellite subscriptions, paid-for content, etc., various consumers or sub-groups of consumers may have access to a different variety of potential video content sources from which to choose at a given point in time. Thus, content suggested to a specific customer in general may or may not be relevant to the customer depending on the video content specifically available to the customer. It is with respect to these and other considerations that the present invention has been made.

SUMMARY

Embodiments of the present invention are directed to utilizing video content available to a user from disparate sources (e.g., local video, paid streaming video, free steaming video, etc.), cross-matching the available content with known, detailed metadata, and providing the cross-matched content in virtual channels customized to the user based on the availability of the content to the user and on user preference data for certain content types/categories. As part of this system, certain video content may undergo a classification process which results in creating detailed, searchable metadata associated with the particular piece of video content. The classified content may be filtered and made accessible to the user through a custom virtual channel on his/her viewing device.

The details of one or more embodiments are set forth in the accompanying drawings and descriptions below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

The accompanying drawings, which are incorporated in and constitute a part of this disclosure, illustrate various embodiments of the present invention. In the drawings.

DETAILED DESCRIPTION

As briefly described above, embodiments of the present invention are directed to aggregating video content available to a user from disparate sources, cross-matching the content with metadata, and providing the content in virtual channels customized to the user based on the availability of the content to the user and on user preference data.

Users are oftentimes overwhelmed with an abundance of available video content. With current systems, a user may be required to access various video content provider systems in order to view available content and subsequently select and view the content. Embodiments of the present invention may be utilized to aggregate all video content to which a user has access from various video content providing systems. The video content may be cross-matched with video metadata that has been filtered and categorized. The cross-matched video content may be processed through various other filters and mapped to one or more classifications. One or more virtual channels may be generated according to the one or more classifications and populated with the cross-matched video content. For example, a user may have a virtual Soap Opera channel generated that comprises a subset of the Soap Opera-related video content available to the user at a given time.

Embodiments of the present invention also provide for an automated purchasing system to automatically purchase paid streaming content for a user based on user preferences and settings.

Figure 1:
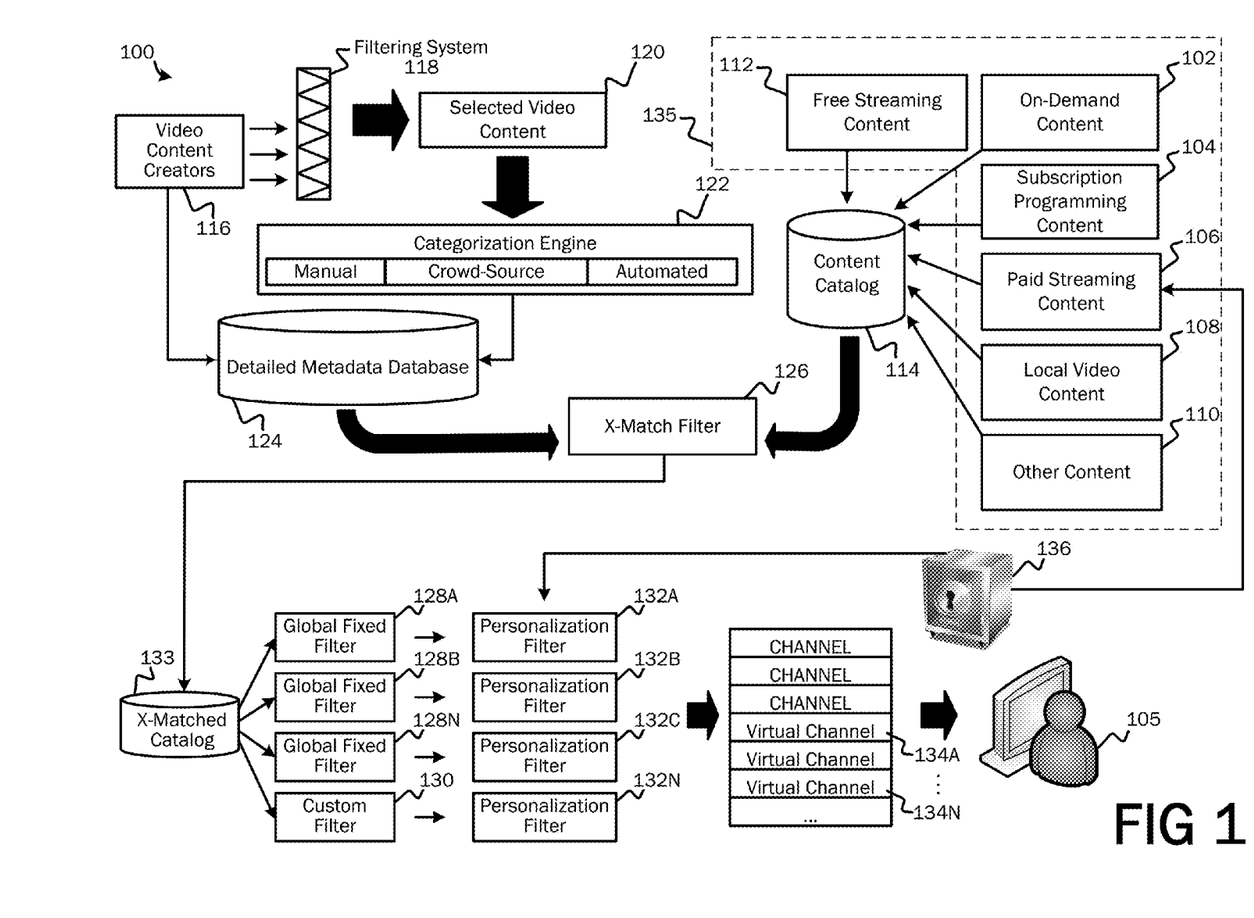
FIG. 1 is a simplified block diagram illustrating a system architecture for providing a custom virtual channel of video content.

Referring now to FIG. 1, a simplified block diagram illustrating a system architecture 100 for providing a custom virtual channel of video content is shown. Consumers of video content may have access to a variety of different video content sources. For example, a user 105 may have access to traditional subscription programming 104 (e.g., broadcast television programming and premium channel programming) via a satellite or cable television service. A user 105 may also have access to traditional on-demand content 102 via a satellite or cable television service. Another type of video content source may include free streaming content 112 which may include video content available via an Internet connection that is viewable without payment. For example, a network may post past episodes of a television program online for a limited time, an online video service, such as Hulu™, may amass content from multiple networks and make that content available for a limited time via a website, and video sharing websites accessed via the Internet, such as YouTube® may provide a variety of video content uploaded and shared by other users. A user 105 may also have access to paid streaming content 106 which may include video content to which a user has access over a distributed network via a membership or service. For example, a user 105 may have a subscription to a digital distribution service such as Netflix® or Hulu Plus™. Paid streaming content 106 may also include pay-per-view rentals and purchased video content via a digital distribution service such as Blockbuster® On-Demand or Amazon® accessible via a distributed network, such as the Internet. Other video content may include local video content 108 and other content 110. For example, local video content may include content a user 105 owns or to which he has access such as, but not limited to, digital video content on DVDs and home videos.

Collectively, the video content provided by all disparate sources 102, 104, 106, 108, 110, 112 available to a user 105 will herein be referred to as "user-accessible content" 135. As should be appreciated, user-accessible content 135 may change based on time, access rights, content restrictions, addition or subtraction of new sources of content, geographic location, etc. According to embodiments, a content catalog 114 may be provided for storing an index of user-accessible content 135. The content catalog 114 may comprise an index of all content to which a given user 105 has access at a specific point in time. Consider for example that a given user 105 has a Netflix® account 106, cable television (CATV) service 104,102, and home movies 108 saved locally on a computing device. The content catalog 114 for the given user 105 may comprise an index of all the video content provided via Netflix® 106 that is available for streaming, an index of all the video content available through the CATV service 104,102 including broadcast television programming and on-demand content, and an index of the locally-saved content comprising the user's home movies 108. As should be appreciated, the video content listed in one user's content catalog 114 may vary from video content in another user's content catalog. Additionally, as mentioned above, video content in a user's content catalog 114 may vary based on such variables as time, access rights, content restrictions, addition or subtraction of new sources of content, geographic location, etc. For example, depending on the time of day, television programming available to a user 105 may be different.

Referring still to FIG. 1, there are thousands if not millions of video content producers 116 continually creating content around the world. Trying to classify and gather metadata on all this content is prohibitively time consuming and costly. Accordingly, a filtering algorithm may be utilized to separate out video content that may be considered worthwhile to classify. Consider, for example, video content from the 1960's. Television shows such as "Star Trek", "Gilligan's Island", and "I Dream of Jeannie" may be considered popular content and may be given considered a higher priority to classify over lesser known shows, such as "The Beautiful Phyllis Diller Show." The filtering algorithm may be utilized in filtering system 118 operable to filter all video created by content providers 116 into a subset of video content, represented as selected video to categorize 120 in FIG. 1. The filtering algorithm utilized in the filtering system 118 may be tunable. For example, the filtering system algorithm may be tuned to filter content based on popularity and may additionally be tuned according to a variety of factors such as by geographical region or location. Content such as personal videos (e.g., a child's dance recital) may not be considered as content worth categorizing or as eligible content for inclusion in a virtual channel, and may accordingly be culled. According to an embodiment, the filtering algorithm may filter content based on such factors as, but not limited to, popularity or age of content.

The system architecture 100 may include a categorization engine 122 operable to analyze and categorize selected video content 120 to create a detailed metadata database 124 comprising specific data, such as descriptive tags pertinent to each piece of video content. According to embodiments, tagging may be done on a globally basis for each piece of selected video content 120, and may not be specific to a particular user's corpus of accessible content 114. Metadata tags may range in type, and may include, but is not limited to, title, length of content, producer, actors, genre, sub-genre, production company, production and original air dates, serialization, season/episode number, quality, thematic elements, native language, or other pertinent characteristics of each piece of selected video content 120.

According to embodiments, the categorization engine 122 may produce tagged metadata content via a variety of ways. For example, selected video content 120 may be manually tagged by a person/persons manually classifying and categorizing video content. The person(s) may work for a video content provider, a company or organization responsible for classifying and categorizing video content, or the like. Tagging metadata may be provided by users voluntarily tagging material in which they are interested. This method may also be referred to as crowd-sourcing. The crowd-source method may include providing a means for various users to provide categorization information and metadata type details for video content. For example, a website, blog, or other electronic transmission may be provided for allowing fans of a particular show to enter details of a particular show or episode. Tagging may also be an automated method based on an algorithmic analysis using a set of rules that may identify characteristics of the selected video content 120. Automated categorization may be an automated means of extracting and tagging a piece of video content with keywords that may be used to categorize the content. For example, various cooking terms may be gleaned from a given piece of video content, and thereby a determination may be made that the given piece of video content may be categorized as cooking-related.

As described above, the detailed metadata database 124 may be populated with metadata comprising descriptive tags associated with video content that has been selected to be categorized. According to another embodiment, some video content creators may provide metadata or tagging information with video content. This metadata may bypass the categorization engine 122 and may be automatically fed into the detailed metadata database 124.

According to an embodiment, the categorization engine 122 may comprise a general filter which may be operable to cull potentially irrelevant video from the tagging process. As should be appreciated, the tagging process may be a potentially time-consuming processing, and the general filter may aid in efficiency in light of the vast amount of video content available in today's digital society.

Still referring to FIG. 1, the system 100 may comprise a cross-match filter 126. Contents of the detailed metadata database may be utilized by the cross-match filter 126 in addition to the index of user-accessible content 135 stored in the content catalog 114 for producing a cross-matched catalog 133 comprising a subset of tagged, searchable video content. This subset of tagged, searchable video content has known characteristics that are identified, cataloged, and may be filtered by a user or by the system 100. According to embodiments, the cross-match filter 126 may add additional metadata tags to at least a subset of the content to which a user has access 135 so that further filtering and processing may be performed.

Having generated a database 133 of tagged metadata associated with video content accessible to a user, the contents of the database 133 may be presented to a set of filters 128, 130, 132, which may be operable to assemble the tagged metadata into virtual channels 134A-N that may conform to specific characteristics that users may identify and utilize to inform their viewing decisions. The set of filters may include globally fixed filters 128A-N, custom filter(s) 130, and/or personalization filters 132A-N.

The various filters 128,130,132 may be operable to filter video content and map the video content to one or more classifications. One or more virtual channels 134 may be generated according to the one or more classifications and populated with video content having similar mapping to the one or more classifications. According to embodiments, the globally fixed filters 128A-N, collectively 128, may be common across users; however, the actual channel content visible to each user may vary depending on the initial set of content 135 available to that particular user. For example, all users may have access to a virtual football channel 134. As can be appreciated, the specific content available via the virtual football channel 134 may differ between users. For example, user A may have a subscription to a sports package through his CATV service, providing a greater selection of possible video content to populate his/her virtual football channel than another user who may not have a subscription to a sports package.

Another type of filter may include one or more custom filters 130. A custom filter 130 may filter video content into various channels 134 that may be customized to a user 105 according to his/her particular likes and dislikes. For example, various movies produced by a certain movie producer may be filtered by a custom filter 130 into a particular channel 134 for a specific user 105 because the specific user enjoys movies by the certain movie producer.

After being filtered through the global fixed filters 128 and one or more custom filters 130, the video contents of the cross-matched catalog 133 may be filtered through one or more personalization filters 132 operable to filter video content according to one or more criteria relevant to a particular user 105. Video content that may be a part of a series may be serialized in the system 100 so that a user's playback history may be recorded and managed. This may prevent episodes that are part of a series from being played back out of order or from being repeated during channel content population. For example, if a television show that is part of a series is included in a custom channel 134 for a user, a personalization filter 132 may be utilized to ensure that the next episode of the show that is shown is the next sequential episode in the series. According to embodiments, a virtual channel 134 may be dedicated to provide serialized content and to play continuous streams of sequential episodes to a user 105. Streams of sequential episodes may be played across multiple viewing sessions. As previously mentioned, the various filters 128,130,132 may be utilized to analyze the cross-matched video content and associated metadata and map the video content to one or more classifications, the classifications being utilized to generate one or more virtual channels 134. As shown in FIG. 1, a plurality of custom virtual channels 134A-N, collectively 134, may be generated. A virtual channel 134 is a virtual channel custom-generated for a specified user 105 based on the content available to that user and any customizations/ personalizations specific to that user. Each custom virtual channel 134 may be associated with one or more classifications and may have a name and/or channel number associated with it. That is, virtual channels 134 may look like existing sorts of television channels; however, virtual channels may provide specific video content chosen for a given user 105 based on the metadata tags associated with the content from the corpus of content 135 to which the user has access. A virtual channel 134 may mimic traditional CATV/satellite channel programming styles in that video content may be scheduled to play on a weekly or daily basis with the inclusion of repeats and reruns. This may be particularly appropriate for video content series that do not require a sequential playback to maintain storyline continuity.

An example of a virtual channel 134 may be a British television programming channel, a family-oriented sitcoms from the 80's channel, a modern sci-fi programs channel, a psychological thrillers channel, etc. A virtual channel 134 may be quasi-fixed or static, wherein video content is streamed in a manner similar to traditional broadcast video channels with no intervention or feedback required from a user, and may not be customizable. Alternatively, a virtual channel 134 may be dynamic and customizable for a user 105. Tagged metadata may be used to assemble a custom virtual channel 134 based on user feedback and preferences that are unique to the user 105. This type of virtual channel may elicit user interaction during playback, and may be defined by either observing user habits or by explicit user interactions. For example, choosing a single or set of video content programs may define a type of classification of video content the user 105 wishes to consume. This may prompt a request for feedback via a rating system. Feedback provided by the user may provide a search for other metadata to add to a given channel 134. Channels of this type may playback a random set of video content which matches usage history or particular metadata characteristics relevant to other content which the user 105 approves for consumption in a given channel 134. Appropriate content may be chosen for the channel based on what is accessible to the user. A virtual channel 134 may be tuned based on further feedback in an iterative process.

According to embodiments, the variety of video content in a virtual channel 134 may be controlled. Certain channels may be directed to a particular genre, wherein another channel may target specific attributes of a nested sub-genre. The level of control to automatically categorize video content into appropriate virtual channels 134 may be specified by algorithms and programming style of the system 100.

According to embodiments, virtual channels 134 may be available to a user 105 through a network-connected video viewing device, for example, a television connected to a cable television (CATV) services network, a television or computer connected to a distributed network, such as the Internet, a mobile computing device, etc. According to embodiments, the creation of virtual channels 134, and the population of video content (i.e., the population of the content catalog 114, the selected video content 120, the detailed metadata database 124, and the cross-matched catalog 133) occurs without interacting with any video streams. A user may select a virtual channel 134 via standard channel selection methods (e.g., channel surfing, entering a channel number, etc.). When video content is selected by a user, the content may be provided from its source 112,102,104,106,108,110 via an appropriate path (e.g., Internet, home data storage, via DOCSIS over a telecom cable infrastructure to which a user subscribes, etc.) to the user. Virtual channels 134 may present users with targeted content choices or generic content channels 134 to consume on demand.

According to embodiments, time-shifting may be implemented with playback of selected video content. Accordingly, a user 105 may be able to rewind, fast-forward, or pause content mid-stream at any time. As mentioned previously, each virtual channel 134 is custom-generated for a user 105. For example, video content available 135 to one user versus another user may vary (e.g., because of location, subscriptions to certain video content providers, locally stored video content, etc.). Additionally, the filtering of video content through custom filter(s) 130 and personalization filter(s) 132 may generate virtual channels 134 with varying content.

According to an embodiment, the system 100 may comprise a recommendation and purchase engine 136. A recommendation and purchase engine 136 may be operable to insert recommended paid content into a virtual video channel and then automatically purchase the paid content 106 on behalf of a user 105 prior to viewing. The purchase engine 136 may be tied to a user's 105 bank account or credit card. Alternatively, a user may deposit an amount of money into a purchase engine account for video content purchases. Purchase recommendation decisions may be made by the purchase engine 136 for recommending video content that a user 105 may has indicated that he/she wants to watch. A purchase recommendation may be determined via an analysis of cross-matched video content and associated metadata for available paid streaming video content having a similar mapping to one or more classifications associated with user preference data.

According to one embodiment, a user 105 may specify a spending amount per time period (e.g., $10 per week, $30 per month, etc.) for purchasing paid content 106. According to another embodiment, a user may specify a number of purchases to make in a time period (e.g., one movie per week, four movies per month, etc.,). Purchasing recommendations may be made according to received content purchasing rules and entered and/or derived user preference data. For example, a user 105 may specify that he/she prefers newly released movies. It may be derived from user interaction data that the user 105 selects a lot of comedy movies. Therefore, a purchasing recommendation may be made by the engine 136 to recommend a piece of paid streaming content 106 that is a newly released comedy movie. If the user selects to view the recommended paid streaming content 106 via a virtual channel, 134 the recommendation and purchase engine 136 may purchase the content on behalf of the user. According to embodiments, the recommendation and purchase engine 136 may be associated with the personalization filter 132. For example, if a user has a $10.00 per month allotment for paid streaming content 106, and if the user has already reached his/her $10.00 limit, paid streaming content 106 may be filtered out by the personalization filter 132. Accordingly, when available video content is presented to the user through his/her virtual channels 134, the content may not include any paid streaming content 106.

Figure 2:
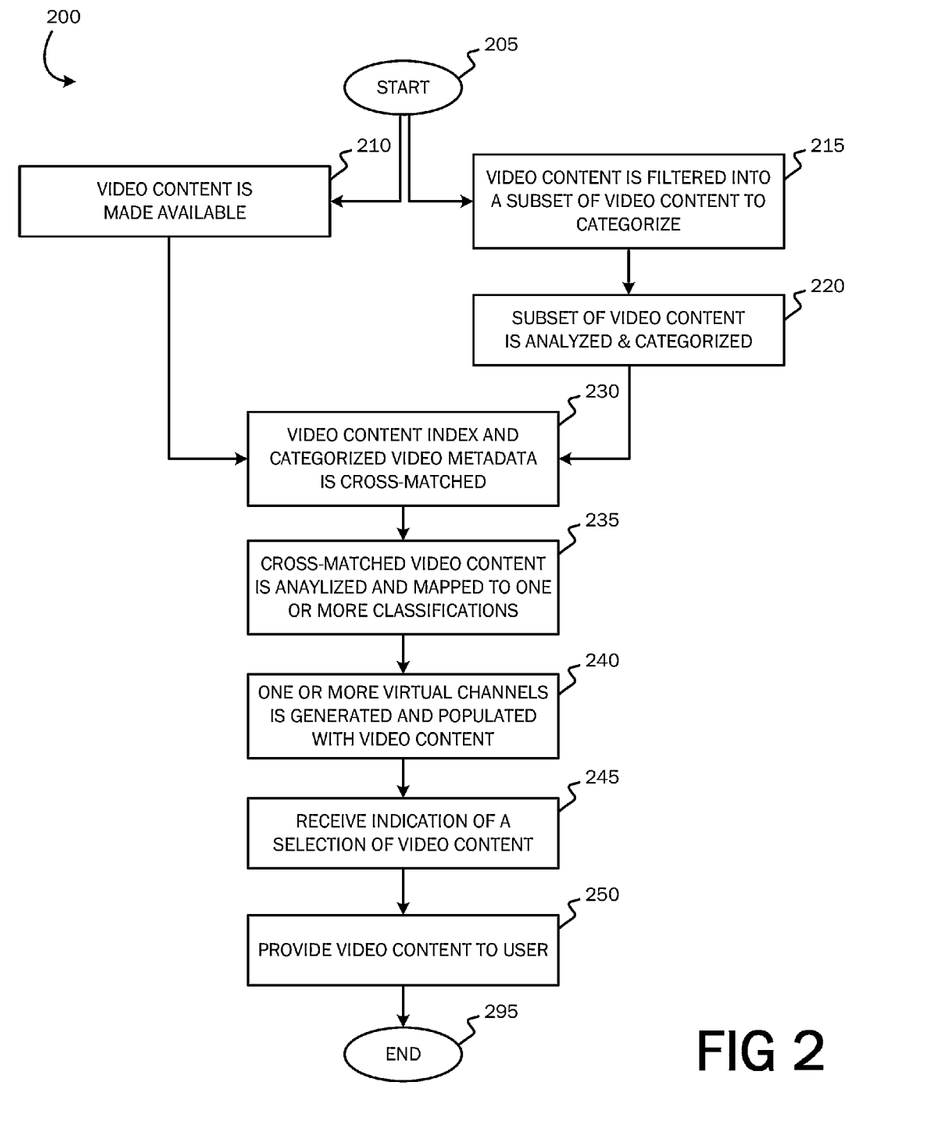
FIG. 2 is a process flow diagram illustrating a method for providing a custom virtual channel of video content.

Having described a system architecture, FIG. 2 is a process flow showing an example method for providing custom virtual channels of video content. The method 200 starts at OPERATION 205 and proceeds to OPERATION 210 where video content 135 is made available. As described above, video content 135 may include any video content to which a user 105 has access at a given time. For example, video content 135 may include traditional subscription programming 104 (e.g., broadcast television programming and premium channel programming), traditional on-demand content 102, free streaming content 112 which may include video content available via an Internet connection that is viewable without payment, paid streaming content 106 which may include video content to which a user has access over a distributed network via a membership or service, and other video content that may include local video content 108 and other content 110 derived from other sources and via methods not described above. According to an embodiment, video content 135 may be made available to a user 105 by a video content provider storing a piece of video content into an online database (e.g., Netflix® database, YouTube® database, etc.). An index of available video content 135 may be generated and stored into a content catalog 114.

At OPERATION 215, all available video content from creators 116 is filtered through a tunable filter 118 into a subset of video that may be relevant for users and that needs to be categorized with detailed metadata such that it can later be turned into content for virtual channels 134. As previously described, the filtering system 118 may filter metadata based on popularity and may be tuned according to a variety of factors such as by geographical region or location. The resulting subset may be referred to as known selected video to categorize 120.

At OPERATION 220, the video selected for categorization 120 may be analyzed and categorized via a categorization engine 122. Descriptive tags pertinent to each piece of video content may be ascribed to each piece of video content 120. Video 120 may be tagged manually, via a crowd-source method, or automatically. Metadata associated with video content that has been tagged and categorized via the categorization engine 122 may be stored in a detailed metadata database 124 (220). Alternatively, as described previously, video content may be pre-indexed and thus may bypass the categorization engine 122 and may be automatically fed into the categorized video metadata database 124.

At OPERATION 230, the video content 135 available to the user 105 is cross-matched with categorized video metadata. Accordingly, the video content available to the user is now tagged, sortable, and searchable. At OPERATION 235, the video content 135 available to the user that has categorization metadata associated with it may be passed through various filters which may include one or more global-fixed filters 128, one or more custom filters 130, and one or more personalization filters 132. The cross-matched video content may be analyzed and mapped to one or more classifications (e.g., comedy, drama, movies with a common actor or producer, etc.).

At OPERATION 240, one or more virtual channels may be generated according to the one or more classifications. For example, a comedy channel, a documentary channel, a history channel, a movies produced by Steven Spielberg channel, etc., may be generated. The cross-matched video content and associated metadata may be filtered into one or more of the one or more virtual channels 134 (240) for display to the user 105.

At OPERATION 245, the user 105 may select a virtual channel 134 or a piece of video content available on a virtual channel. When a user 105 selects a virtual channel 134, a listing of the video content available on the given channel may be displayed to the user. Other information may be provided, such as the source from which the video content is being provided. For example, a virtual channel 134 may have a listing of two movies and six television programs available. The movies may be provided by a paid subscription the user has with a video subscription service (e.g., Netflix®). A logo associated with the video subscription service may be displayed next to the video content provided by the subscription service. Other metadata information such as genre, actors, producer, etc. may also be provided.

Upon receiving an indication of a selection (245) of a piece of video content by the user 105, the selected video content may be streamed to the user from the video content provider 112,102,104,106,108,110 at OPERATION 250. According to embodiments, advertising, similar that that seen in traditional television broadcasts, may be included during video playback. Advertisements may be based on the classification of the content of a channel 134, on a demographic profile, on an individual profile of a user 105, or by any number of other advertising methodologies. The method 200 ends at OPERATION 295.

Figure 3:
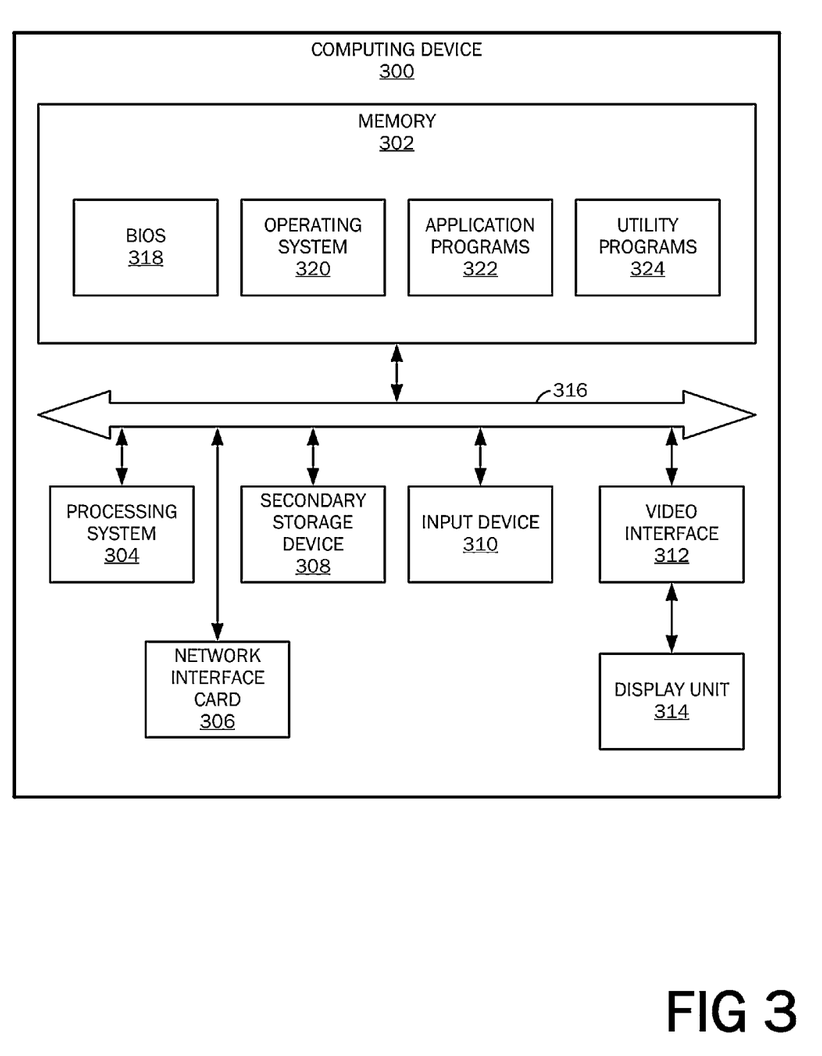
FIG. 3 is a simplified block diagram illustrating an example computing device with which embodiments of the present invention may be implemented.

FIG. 3 is a block diagram illustrating an example computing device 300 with which embodiments of the present invention may be implemented. In some embodiments, the video viewing devices and/or the categorization engine 122, databases 124,114, and filters 118,126,128,130,132 may be implemented using one or more computing devices like the computing device 300. It should be appreciated that in other embodiments, the video viewing devices and/or the categorization engine 122, databases 124,114, and filters 118,126, 128,130,132 are implemented using computing devices having hardware components other than those illustrated in the example of FIG. 3. According to an embodiment, the computing device 300 may be a set-top box (STB), digital video recorder (DVR) or other type of streaming media video system operable to support cable television (CATV) services, satellite services, terrestrial and internet protocol (IP) broadcasting.

Computing devices are implemented in different ways in different embodiments. For instance, in the example of FIG. 3, the computing device 300 comprises a memory 302, a processing system 304, a network interface 306, a secondary storage device 308, an input device 310, a video interface 312, a display unit 314, and a communication medium 316. In other embodiments, the computing device 300 is implemented using more or fewer hardware components (e.g., a video interface, a display unit, or an input device).

The memory 302 includes one or more computer-readable storage media capable of storing data and/or computer-executable instructions. In various embodiments, the memory 302 is implemented in various ways. For example, the memory 302 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users. The memory 302 also stores one or more utility programs 324 that, when executed by the processing system 304, cause the computing device 300 to provide utilities to other software programs.

Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for populating one or more virtual channels with accessible video content, the method comprising:
    generating an index of user accessible video content, the user accessible content comprising broadcast content;
    acquiring video content;
    filtering the video content into a subset of video content to categorize, the filtering comprising applying a tunable algorithm to the video content, the tunable algorithm comprising parameters including at least one of popularity, geographical region, and age of content;
    adding descriptive tags to metadata associated with each piece of video content of the subset of video content;
    cross-matching the index of user accessible video content with the tagged subset of video content;
    analyzing the metadata associated with the cross-matched video content and mapping the cross-matched video content and associated metadata to one or more classifications;
    generating one or more virtual channels according to one or more classifications;
    populating the one or more generated virtual channels with cross-matched video content and associated metadata having a similar mapping to the one or more classifications, the cross-matched video content comprising one or more of broadcast content and local content;
    determining if a paid streaming content limit has been reached; and
    filtering the generated virtual channel to remove paid streaming content if the limit has been reached.

2. The method of claim 1, wherein generating an index of user accessible video content includes acquiring one or more indexes of video content available to the user, the video content available to the user including one or more of free streaming video content, on-demand video content, subscription programming video content, paid streaming video content, and local video content.

3. The method of claim 1, wherein filtering further comprises culling unwanted video content.

4. The method of claim 1, further comprising receiving a selection of video content provided in a virtual channel and providing the selected video content to the user.

5. The method of claim 4, wherein if the selected video content is paid streaming content and has not been previously purchased by the user, providing an interface for allowing the user to purchase the selected video content.

6. The method of claim 1, wherein filtering video content into a subset of video content to categorize includes utilizing a filtering algorithm to filter the video content into a subset of video content to categorize according to one or more of popular video content and video content applicable to a given geographic region.

7. The method of claim 1, wherein adding descriptive tags to metadata associated with each piece of video content of the subset of video content includes one or more or a combination of manual categorization, crowd-source categorization, and automated categorization.

8. The method of claim 1, further comprising gathering user preference data to generate a user profile for a user.

9. The method of claim 8, wherein gathering user preference data includes gathering preference data input by the user and gathering preference data associated with video content selection choices made by the user.

10. The method of claim 8, further comprising:
    analyzing the metadata associated with the cross-matched video content and mapping the cross-matched video content and associated metadata to one or more classifications associated with the user profile;
    generating one or more virtual channels according to one or more classifications associated with the user profile; and
    populating the one or more generated virtual channels with cross-matched video content and associated metadata having a similar mapping to the one or more classifications associated with the user profile.

11. The method of claim 1, further comprising analyzing the metadata associated with the cross-matched video content and identifying video content that is part of a series grouping.

12. The method of claim 11, further comprising if one or more generated virtual channels comprise video content that is part of a series grouping, populating the one or more generated virtual channels with other identified video content that is part of the series grouping.

13. The method of claim 1, further comprising:
    receiving authorization from a user for automated video content purchases;
    receiving automated video content purchasing rules from the user;
    analyzing the cross-matched video content and associated metadata for available paid streaming video content having a similar mapping to one or more classifications associated with the user profile, the available paid streaming video content having not been purchased previously by the user;

determining a best match for a paid streaming video content purchase according to user preference data and received automated video content purchasing rules;

recommending the best match for a paid streaming video content purchase to the user;

receiving an indication of a selection of the recommended paid streaming video content;

automatically purchasing the paid streaming video content; and providing the selected paid streaming video content to the user.

14. A system for populating one or more virtual channels with accessible video content, the system comprising:

a filtering system operable to filter video content into a subset of video content to categorize according to popularity and geographic region, the video content comprising broadcast content;

a categorization engine operable to:
add descriptive tags to metadata associated with each piece of video content of the subset of video content; and
generate a database comprising the tagged subset of video content;

a cross-match filter operable to cross-match an index of user accessible video content with the tagged subset of video content; and one or more filters operable to:
analyze the metadata associated with the cross-matched video content and map the cross-matched video content and associated metadata to one or more classifications;
generate one or more virtual channels according to one or more classifications;
populate the one or more generated virtual channels with cross-matched video content and associated metadata having a similar mapping to the one or more classifications;
determine if a paid streaming content limit has been reached; and
filter the generated virtual channel to remove paid streaming content if the limit has been reached.

15. The system of claim 14, further comprising a recommendation and purchase engine operable to:
receive authorization from a user for automated video content purchases;
receive automated video content purchasing rules from the user;
analyze the cross-matched video content and associated metadata for available paid streaming video content having a similar mapping to one or more classifications associated with the user profile, the available paid streaming video content having not been purchased previously by the user;
determine a best match for a paid streaming video content purchase according to user preference data and received automated video content purchasing rules;
recommend the best match for a paid streaming video content purchase to the user;
receive an indication of a selection of the recommended paid streaming video content;
automatically purchase the paid streaming video content; and
provide the selected paid streaming video content to the user.

16. The system of claim 14, the one or more filters further operable to:
gather user preference data to generate a user profile for a user, wherein gathering user preference data includes gathering preference data input by the user and gathering preference data associated with video content selection choices made by the user;
analyze the metadata associated with the cross-matched video content and map the cross-matched video content and associated metadata to one or more classifications associated with the user profile;
generate one or more virtual channels according to one or more classifications associated with the user profile; and
populate the one or more generated virtual channels with cross-matched video content and associated metadata having a similar mapping to the one or more classifications associated with the user profile.

17. The system of claim 16, the one or more filters being further operable to analyze the metadata associated with the cross-matched video content and identify video content that is part of a series grouping.

18. The system of claim 17, further comprising if one or more generated virtual channels comprising video content that is part of a series grouping, the one or more second filters being further operable to populate the one or more generated virtual channels with other identified video content that is part of the series grouping.

19. A non-transitory computer-readable medium containing computer-executable instructions which when executed by a computer perform a method for populating one or more virtual channels with accessible video content, the method comprising:

generating an index of user accessible video content, the user accessible content including one or more of free streaming video content, on-demand video content, subscription programming video content, paid streaming video content, and local video content;

gathering user preference data to generate a user profile for the user, wherein gathering user preference data includes gathering preference data input by the user and gathering preference data associated with video content selection choices made by the user;

acquiring video content;

filtering the video content into a subset of video content to categorize, the subset of video content being associated with popular video content and a geographic region;

adding descriptive tags to metadata associated with each piece of video content of the subset of video content, the tagging including one or more or a combination of manual categorization, crowd-source categorization, and automated categorization;

generating a database comprising the tagged subset of video content;

cross-matching the index of user accessible video content with the categorized subset of video content;

analyzing the metadata associated with the cross-matched video content and mapping the cross-matched video content and associated metadata to one or more classifications, one or more of the one or more classifications being associated with the user profile;

identifying video content that is part of a series grouping;

generating one or more virtual channels according to one or more classifications;

populating the one or more generated virtual channels with cross-matched video content and associated metadata having a similar mapping to the one or more classifications, and if one or more generated virtual channels comprise video content that is part of a series grouping, populating the one or more generated virtual channels with other identified video content that is part of the series grouping, the cross-matched video content comprising broadcast content and local content;

determining if a paid streaming content limit has been reached; and filtering the generated virtual channel to remove paid streaming content if the limit has been reached.

20. The computer-readable medium of claim 19, the method further comprising:

receiving authorization from a user for automated video content purchases;

receiving automated video content purchasing rules from the user;

analyzing the cross-matched video content and associated metadata for available paid streaming video content having a similar mapping to one or more classifications associated with the user profile, the available paid streaming video content having not been purchased previously by the user;

determining a best match for a paid streaming video content purchase according to user preference data and received automated video content purchasing rules;

recommending the best match for a paid streaming video content purchase to the user;

receiving an indication of a selection of the recommended paid streaming video content;

automatically purchasing the paid streaming video content; and providing the selected paid streaming video content to the user.

* * * * *